United States Patent [19]
Gray et al.
[11] Patent Number: 4,964,946
[45] Date of Patent: Oct. 23, 1990

[54] PROCESS FOR FABRICATING SELF-ALIGNED FIELD EMITTER ARRAYS

[75] Inventors: Henry F. Gray; George J. Campisi, both of Alexandria, Va.

[73] Assignee: The United States of America as represented by the Secretary of the Navy, Washington, D.C.

[21] Appl. No.: 473,752

[22] Filed: Feb. 2, 1990

[51] Int. Cl.[5] .......................... B44C 1/22; C23F 1/02; C03C 15/00; C03C 25/06

[52] U.S. Cl. .................................... 156/643; 156/644; 156/653; 156/656; 156/657; 156/663; 156/668; 313/309; 313/351

[58] Field of Search .................. 313/309, 351; 427/77, 427/78; 156/643, 644, 653, 655, 656, 657, 659.1, 662, 663, 668; 437/23, 127, 916; 357/17, 30

[56] References Cited

U.S. PATENT DOCUMENTS 3,894,332 7/1975 Nathanson et al. ............ 437/916 X
3,981,023 9/1976 King et al. ......................... 437/23 X
3,998,678 12/1976 Fukase et al. ....................... 156/651
4,685,996 8/1987 Busta et al. ......................... 156/651

Primary Examiner—William A. Powell
Attorney, Agent, or Firm—Thomas E. McDonnell; Peter T. Rutkowski

[57] ABSTRACT

A process for fabricating self-aligned field emitter arrays using a self-leveling planarization technique, e.g. spin-on processes, is disclosed which includes the steps of depositing a dielectric layer on top of an array of field emitters, depositing a thin conducting film over the dielectric layer, and applying a planarization layer on the thin conducting film. Thereafter the structure is selectively etched until the underlying conducting layer is exposed in regions surrounding the field emitters, thereby defining the grid apertures. The conducting layer and dielectric layer are then selectively etched sequentially to a depth sufficient to expose a field emitter cathode tip at each field emitter site. This invention uses the concept of a self-leveling, planarizing material to define the grid apertures. After defining the aperture hole size and location, then appropriate etching processes can form the apertures themselves thereby exposing the sharp field emitters which yield an integrally gridded three-dimensional field emitter array structure.

12 Claims, 2 Drawing Sheets

PROCESS FOR FABRICATING SELF-ALIGNED FIELD EMITTER ARRAYS

BACKGROUND OF THE INVENTION

1. Field of the Invention

This invention relates to a process for fabricating a field emitter array electron source by a self-aligned process, and more particularly to a process for fabricating a field emitter array electron source which uses a self-leveling, planarizing material to define its grid apertures.

2. Background Description

In fabricating field emitter arrays, the grid aperture holes can be fabricated by a method described in U.S. Pat. No. 3,998,678 issued to S. Fukase et al. on Dec. 21, 1976. That is, they can be fabricated by: (1) having a disc of masking material on top of each field emitter thereby providing a ledge to help form a mold for chemically deposited oxides or dielectrics, and (2) using optical, x-ray, or electron beam lithography to define the grid aperture holes in a resist. The problem with using optical or electron beam lithography to create the aperture holes in the extraction grid is that there may be as many as twelve masking operations—each introducing error in the positioning of the field emitters relative to the grid apertures. This cumulative error creates misalignment of the grid aperture with its corresponding field emitter thereby causing poor field emission.

SUMMARY OF THE INVENTION

Accordingly, it is a general object of the present invention to fabricate field emitter arrays by a process where no lithography, e.g., optical, e-beam, etc., needs to be used to define the location of the grid apertures.

It is another object of the present invention to fabricate field emitter arrays by a process where precise registration of each field emitter with respect to the center of each aperture is obtained automatically, regardless of the location of the emitter.

It is a further object of the present invention to fabricate field emitter arrays by a process where uniform removal of material covering the field emitters is obtained which leads to a uniform aperture size.

The foregoing objects are accomplished by a process for fabricating self-aligned field emitter arrays using self-leveling planarization which includes the steps of depositing a dielectric layer on top of an array of field emitters, depositing a thin conducting film over the dielectric layer, and applying a planarization layer on the thin conducting film. Thereafter the structure is selectively etched until the underlying conducting layer is exposed in regions surrounding the field emitters, thereby defining the grid apertures. The conducting layer and dielectric layer are then selectively etched in the grid aperture regions sequentially to a depth sufficient to expose a field emitter cathode tip at each field emitter site. This invention uses the concept of a self-leveling, planarizing material to define the grid apertures. After defining the aperture hole size and location, then appropriate etching processes can form the apertures themselves thereby exposing the sharp field emitters which yield an integrally gridded three-dimensional field emitter array structure.

BRIEF DESCRIPTION OF THE DRAWINGS

A more complete appreciation of the invention will be readily obtained by reference to the following Description of The Preferred Embodiment and the accompanying drawings wherein.

DESCRIPTION OF THE PREFERRED EMBODIMENT

Figure 1A:
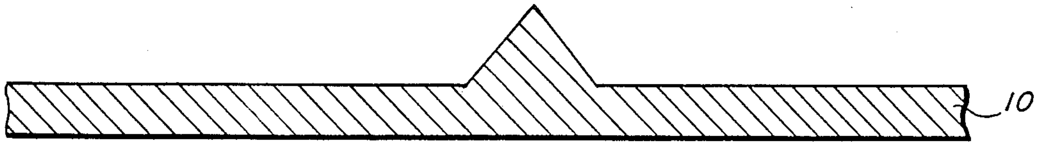
FIGS. 1(A–G) are sectional views showing the process of the preferred embodiment for fabricating a field emitter electron source by a self-aligned technique.

As shown in FIG. 1A, the process described in this invention starts with a set of sharp field emitters 11 in a layer 10. One particular method for manufacturing the field emitter layer 10 with field emitter tips 11 is shown and described in U.S. Pat. No. 4,307,507 issued to H. Gray et al. on Dec. 29, 1981, which patent is herein incorporated by reference. The field emitter layer 10 may be a metal, a semiconductor, or any conducting medium capable of emitting electrons under the of an electric field.

Figure 1B:
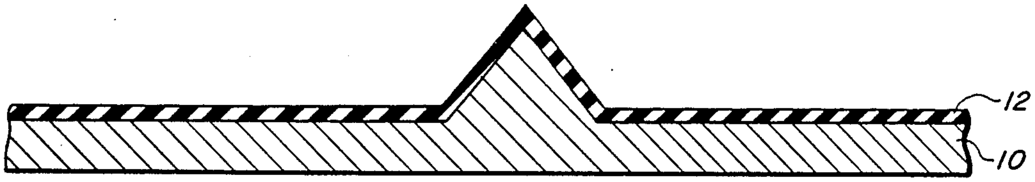

FIG. 1B is a cross sectional view the second step of the current inventive process wherein the emitter structure of FIG. 1A is covered with a thin passivation layer 12. This layer 12 can be a silicide, dielectric, or any other appropriate material, such as a thermal $SiO_2$ layer, $Si_3N_4$ layer or a metal layer, typically 30 Angstroms thick. The purpose of the thin passivation layer 12 is to protect the crystallographically sharp points 11 of the electron-emitting from subsequent etching.

Figure 1C:
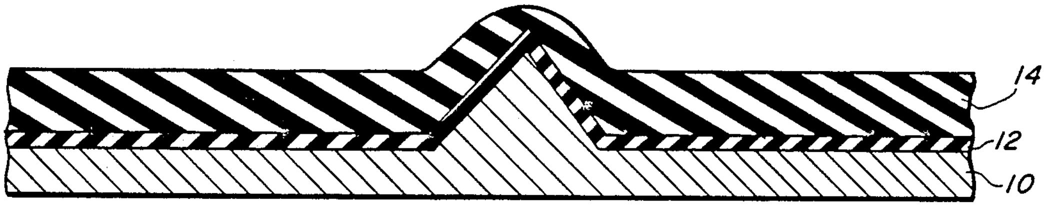

A dielectric layer 14 is then de on the passivation layer 12 as shown in FIG. 1C, by a suitable technique such as by chemical vapor deposition (CVD). The dielectric layer 14 may be from 1–2 μm thick and may be, for example $SiO_2$.

Figure 1D:
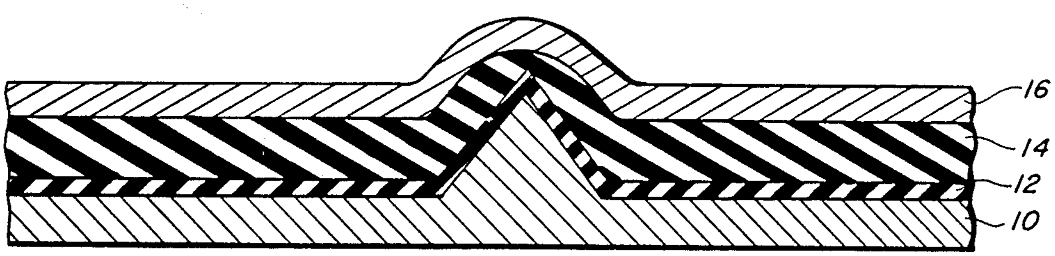

As shown in FIG. 1D, a thin conduit film 16 is then deposited over the dielectric layer 14 any of a number of processes, e.g., thermal evaporation, e-beam deposition, CVD, aqueous plating, plasma deposition, etc. For the thin conducting film 16, there may be employed a selected from any conducting material, for example Mo, W, Pt, Nb, Ta, and Al with a preferred thickness of approximately 0.5 μm.

Figure 1E:
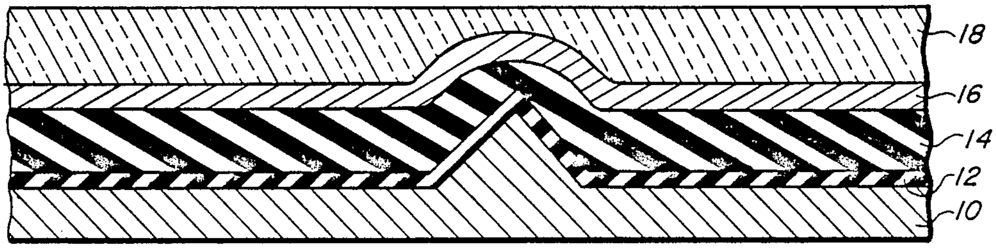

Then a planarization layer 18 is by one of a number of self-leveling planarization processes, e.g., spinning as shown in FIG. 1E. This planarization layer 18 could be a material selected from spin-on polymide, photoresist, spin-on glass, etc. Its purpose is to flow on top of the three dimensional coated field emitter point structure of FIG. 1D such that the top surface of the planarization layer 18 is flat or almost flat. The fundamental property of this planarization layer 18 is that the thickness directly above the field emitter 11 is appreciably thinner than at all other locations.

Figure 1F:
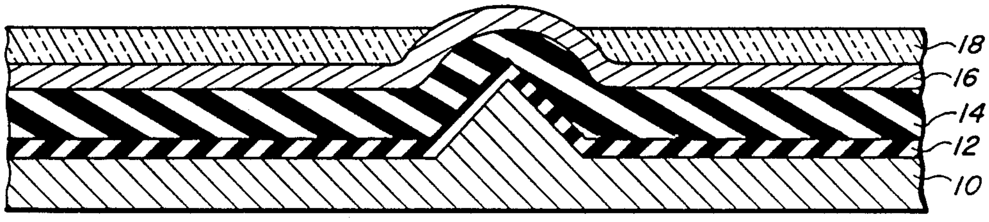

The planarization layer 18 is then et ched, e.g., in a planar plasma etcher using appropriate etching gases, or any other of a number of wet or dry etching procedures, until the conducting layer 16 is exposed in a region above the field emitter tip 11, as shown in FIG. 1F.

Figure 1G:
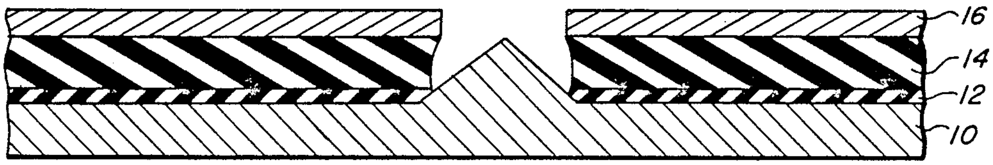

Then the conducting 16 and dielectric layers 14 and 12 are selectively etched sequentially, e.g., in a planar plasma, reactive ion beam or reactive ion etcher, to a sufficient to expose a field emitter cathode tip 11 at each field emitter site. Appropriate etching gases are used, which are specific to the layer of material to be etched. The planari layer 18 is also removed leaving the final product as shown FIG. 1G.

The foregoing has described a process for fabricating self-aligned field emitter arrays which uses the concept of a self-leveling, planarizing material to define the grid apertures. After defining the aperture hole size and location, then appropriate etching processes can form the apertures themselves thereby exposing the sharp field emitters which yield an integrally gridded three-dimensional field emitter array structure. No lithography, e.g., optical, e-beam, etc., needs to be used to define the location of the extraction apertures. Precise registration of each field emitter with respect to the center of each aperture is obtained automatically, regardless of the location of the field emitter, i.e., field emitters do not have to be at well defined locations such as in a square array and uniform removal of material covering the field emitters is obtained which leads to a uniform aperture size.

Obviously, many modifications and variations of the present invention are possible in light of the above teachings. For example, the concept disclosed would be the same regardless of the geometries involved, i.e. the planarization technique could be used in the fabricating devices of smaller or larger dimensions. Thus it is principally a manufacturing concern. It is therefore understood tat within the scope of the appended claims the invention may be practiced otherwise than as specifically described.

What is claimed and desired to be secured by Letters Patent of the United States is:

1. A process for fabricating self-aligned field emitter arrays which includes the steps of:

depositing a dielectric layer on top of an array of field emitters;

depositing a thin conducting film over the dielectric layer; applying a planarization layer on the thin conducting film by a self-levelling process;

selectively etching the planarization layer until the underlying conducting film is exposed in regions surrounding the field emitters, thereby defining grid apertures; and selectively etching the conducting film and dielectric layer sequentially to a depth sufficient to expose a field emitter cathode tip at each field emitter site.

2. The process for fabricating self-aligned field emitter arrays of claim 1 which further comprises the step of covering the array of field emitters with a passivation layer, prior to depositing said dielectric layer.

3. The process for fabricating self-aligned field emitter arrays of claim 1, wherein said dielectric layer is deposited by a chemical vapor deposition technique.

4. The process for fabricating self-aligned field emitter arrays of claim 3, wherein said dielectric layer $SiO_2$ and is from 1–2 $\mu$m thick.

5. The process for fabricating self-aligned field emitter arrays of claim 1, wherein said thin conducting film consists of a material selected from the group consisting of Mo, W, Pt, Nb, Ta, and Al.

6. The process for fabricating self-aligned field emitter arrays of claim 5, wherein said thin conducting film is approximately 0.5 $\mu$m thick.

7. The process for fabricating self-aligned field emitter arrays of claim 1, wherein said planarization layer is applied by a spinning process and is a material selected from the group consisting of spin-on polymide, photoresist, and spin-on glass.

8. The process for fabricating self-aligned field emitter arrays of claim 2, wherein said dielectric layer is deposited by a chemical vapor deposition technique.

9. The process for fabricating self-aligned field emitter arrays of claim 8, wherein said dielectric layer is $SiO_2$ and is from 1–2 $\mu$m thick.

10. The process for fabricating self-aligned field emitter arrays of claim 2, wherein said thin conducting film consists of a material selected from the group consisting of Mo, W, Pt, Nb, Ta, and Al.

11. The process for fabricating self-aligned field emitter arrays of claim 10, wherein said thin conducting film is approximately 0.5 $\mu$m thick.

12. The process for fabricating self-aligned field emitter arrays of claim 11, wherein said planarization layer is applied by a spinning process and is a material selected from the group consisting of spin-on polymide, photoresist, and spin-on glass.

* * * * *